June 27, 1961 W. P. MASON 2,989,799

STABILIZATION OF QUARTZ CRYSTAL FREQUENCY CONTROLLING ELEMENTS

Filed Oct. 15, 1958

INVENTOR
W. P. MASON
BY
H. O. Wright
ATTORNEY

United States Patent Office 2,989,799
Patented June 27, 1961

2,989,799

STABILIZATION OF QUARTZ CRYSTAL FREQUENCY CONTROLLING ELEMENTS

Warren P. Mason, West Orange, N.J., assignor to Bell Telephone Laboratories, Incorporated, New York, N.Y., a corporation of New York Filed Oct. 15, 1958, Ser. No. 767,406
8 Claims. (Cl. 29—25.35)

This invention relates to quartz crystal frequency controlling elements and to methods of treating these elements.

Piezoelectrically driven quartz crystal elements are extensively used as frequency standards and as frequency controlling elements in oscillators, electrical wave filters, electroacoustical apparatus and the like. A comprehensive discussion of the properties and uses of quartz crystals may be found for example in chapter VI of applicant's book, entitled "Piezoelectric Crystals and Their Applications to Ultrasonics," published by D. Van Nostrand Co., Inc., New York, 1950.

Such elements afford probably the highest degree of frequency stability attainable throughout an extensive frequency range in each of their several fields of wide applicability. However, difficulties have been encountered with respect to frequency changes with time of such elements particularly where they are subjected to even an occasional surge of power in excess of the normal maximum operating amplitude and also where the crystal is subjected to mechanical shock. Indeed, even the mechanical shocks incident to grinding the crystal in the initial sizing operations are believed to impair the crystal with respect to its ability to maintain its frequency without change over extended periods of time.

Accordingly, a principal object of the invention is to eliminate the tendency of quartz crystal frequency controlling elements to change frequency with the passage of time.

A further principal object is to eliminate frequency changes of quartz crystal frequency controlling elements resulting from mechanical shocks or electrical surges of amplitude greater than those anticipated for normal operating conditions.

A still further object is to extend the range of usefulness of quartz crystal frequency controlling elements with respect to the maintenance of their frequency stability with the passage of time when subjected to excessive electrical energy surges or to mechanical shocks.

In accordance with the present invention, it has been found that if a quartz crystal frequency controlling element is processed in accordance with the method described hereinunder, it will have substantially no tendency to undergo frequency variation with the passage of time even when subjected to surges of electrical energy and mechanical shocks of appreciably greater amplitude than have been found to produce frequency instability in prior art quartz crystal frequency controlling elements.

The method of the present invention comprises introducing into the quartz crystal additional impurity atoms of the same valence (+4) as silicon, irradiating the crystal with neutrons at a predetermined concentration, heating the crystal to between 400 and 450 degrees centigrade, and maintaining the crystal at the elevated temperature while subjecting it to a predetermined vibrational strain. Thereafter it is, of course, cooled to room temperature.

The method of the invention is based upon the theoretical concept that the changes in frequency with time of a quartz crystal frequency controlling element result from displacements and realignments of the dislocation loops within the atomic lattice of the crystal. The several steps of the method of the invention mutually cooperate in the formation of closely spaced, more firmly pinned dislocation loops which require much larger electrical energy surges and much larger mechanical shocks to cause displacements. Hence, crystals processed in accordance with the method of the invention are capable of withstanding much greater strain without suffering frequency deviations, that is, they have substantially enhanced frequency stability with time and can be satisfactorily operated under considerably more severe operating conditions involving either electrical surges or mechanical shocks, or both, of substantially greater amplitude than would cause quartz crystal frequency controlling elements of the prior art to deviate appreciably in frequency from their predetermined desired values.

The above and other objects, features, and advantages and the principles of the invention will be more readily comprehended from a perusal of the following detailed description and from the appended claims.

Figure 1:
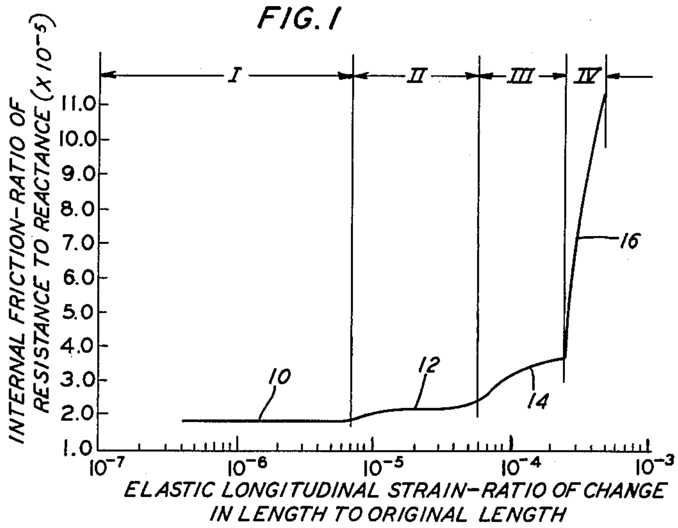
FIG. 1 illustrates the variation with elastic longitudinal strain of the internal friction in a quartz crystal throughout four regions of strain.
Figure 1A:
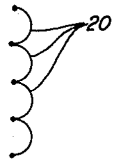
FIG. 1A illustrates the pinning of the dislocation loops in the first region and the bowing out of the loops as a function of the strain; this is the region (I) of low elastic strain of FIG. 1.
Figure 1B:
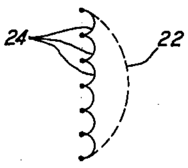
FIG. 1B illustrates a breakaway of the dislocation loops from their pinning points and a reforming into other loops occurring in the second region (II) or region of moderately increased elastic strain of FIG. 1.
Figure 1C:
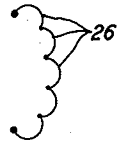
Figure 1D:
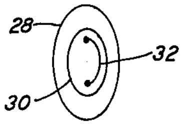
Figure 2:
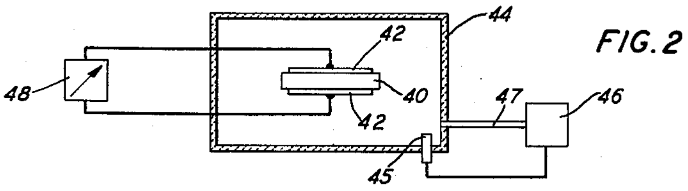
Figure 3:
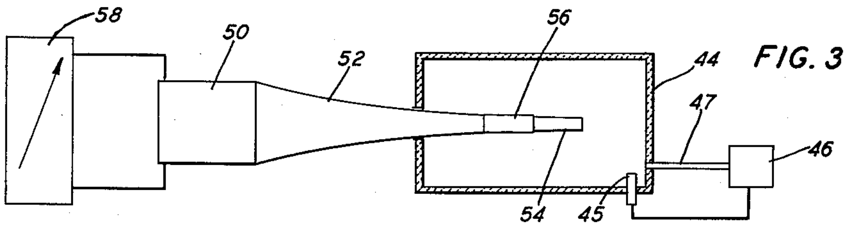

FIG. 1C illustrates dislocation loop after it has broken away from impurity pinning points and has become unstable under the action of the applied strain. In this region further motion is held up by cross dislocations which are closer together than the loop lengths actuated. This is the third region (III) of strain of FIG. 1;

FIG. 1D illustrates the multiple production of large dislocation loops formed as the elastic strain approaches the amplitude at which the crystal is ultimately shattered, i.e. the fourth region (IV) of strain of FIG. 1;

FIG. 2 illustrates diagrammatically a first means of imparting a predetermined mechanical strain at an elevated temperature to a quartz crystal element of the invention; and FIG. 3 illustrates diagrammatically a second means of imparting a predetermined mechanical strain at an elevated temperature to a quartz crystal element of the invention.

In applicant's book, entitled "Physical Acoustics and the Properties of Solids," published by D. Van Nostrand Co., Inc., Princeton, New Jersey, 1958, at page 286, in the second paragraph of section 10.1 of chapter X, it is stated:

"For the very highest stability required in primary frequency standards, they (quartz crystals and the like as discussed in the first paragraph, page 286) still leave something to be desired since there is a residual frequency drift of about one part in $10^9$ per day, which persists after initial changes are over. For this reason, the causes of elastic changes and internal dissipation are a matter of considerable practical interest."

Chapter X of applicant's above-mentioned book proceeds to discuss the probable causes of such frequency changes and summarizes the findings of his own and numerous other investigations in this connection. Other significant publications relating to this problem are specifically cited in footnote references in the book.

It has further been found, as illustrated for example by the curve 10, 12, 14, 16 of FIG. 1 of the present application, that the internal friction of a quartz crystal passes through four stages or regions designated by Roman numerals I through IV, inclusive, for the four portions 10, 12, 14 and 16, respectively, of the curve of FIG. 1 as the elastic longitudinal strain on the cyrstal is increased. In FIG. 1 the scale of elastic strain is a logarithmic scale.

Up to strains of approximately $7\times10^{-6}$ (ratio of increase in length to original length), the internal friction (represented by the inverse of the quality factor Q, where Q is the ratio of mechanical reactance to mechanical resistance) remains constant. This is believed to indicate that the dislocation loops, represented by loops 20 of FIG. 1A, remain pinned to impurity atoms at strain amplitudes within this region, designated region I.

If quartz crystal frequency controlling elements could conveniently be operated at all times within region I, no appreciable variation of their frequency with time would be likely to be encountered. However, in the great majority of instances it is impossible to avoid energy surges which though of short duration and relatively small amplitude are sufficient to cause the strain to exceed the upper limit of region I. Indeed, the initial grinding process required to appropriately size the quartz crystal frequency controlling element tends to cause the formation of new dislocation loops which may be quite unstable.

Surges of energy extending into region II, therefore, are likely to cause the longer of the dislocation loops 20 to break away from their pinning points, momentarily forming longer dislocation loops such as loop 22 of FIG. 1B. When such longer loops come into contact with other impurity atoms they become pinned and the usual result is the formation of a number of dislocation loops such as loops 24 of FIG. 1B which, in general, can be expected to be shorter than the original loops 20 of FIG. 1A. This will cause an increase in the frequency of the element which is a phenomenon very commonly encountered in connection with prior art quartz crystal frequency controlling elements.

Regions III and IV of FIG. 1 represent regions of increased strain in which the internal friction increases more rapidly with increase in strain. The upper limit of region IV is the strain at which the crystal shatters. FIGS. 1C and 1D represent the increasing tendency of the shorter dislocation loops to become unpinned forming longer loops 28, 30, 32 of FIG. 1D leading to increasing instability until actual disintegration of the crystal occurs.

In accordance with the principles of the present invention, an initial step in the method of the invention designed to more effectively stabilize the frequency of quartz crystal frequency controlling elements may be explained as follows.

Since the dislocation loops in general are pinned to impurity atoms in the crystal and a nominally pure quartz crystal has relatively few impurity atoms (approximately thirty parts per million, by way of typical example), it would seem reasonable to expect that the deliberate introduction of a small number of additional impurity atoms of suitable substances into the quartz crystal structure would facilitate the formation of even shorter dislocation loops more firmly pinned to conveniently located impurity atoms. Such loops being less subject to displacement would tend to further extend the range of strain amplitudes over which linear or stable frequency operation can be obtained.

This has indeed proven to be the case and additions of impurity atoms of germanium or manganese to bring the impurity content within the range of from 100 parts in a million to one part in 100 (i.e. one percent) have been found to increase the facility with which a greater degree of stabilization of the frequency of quartz crystal frequency controlling elements can be realized. A concentration of 1,000 parts in a million of suitable impurity atoms appears to be substantially optimum in most instances. One method for introducing such impurity atoms into the lattice of the crystal is to grow the crystal from a solution containing substitutional "impurity" atoms such as germanium and manganese which have the same valence of +4 as silicon. Concentrations of impurity atoms exceeding one percent are not recommended as strains developing in the crystal may then become excessive.

Other substances suitable as "impurity atoms" having a valence of +4 are iridium, molybdenum, osmium, lead, ruthenium, tin, tellurium, thallium, titanium, uranium, vanadium, tungsten, and zirconium. While the carbon atom also has a valence of +4, it has been found that it does not enter interstitially in the quartz crystal lattice but instead makes a bond with silicon as silicon carbide. Because of this, carbon is not a suitable substance for modifying quartz crystals to stabilize their frequency characteristics for the purposes of the present invention.

A further step, which can be used by itself or more effectively in addition to and in conjunction with either or both of the other steps of the overall method, is to introduce vacancies in the crystal structure, thus creating discontinuities in the dislocation lines which will act as fixed nodes under stress and thus more effectively pin the dislocation loops and tend to induce shorter loops. Vacancies in the crystal structure are readily produced by irradiating the quartz with neutrons. The amount of irradiation should not be premitted to reach an integrated total of more than $2\times10^{18}$ neutrons per square centimeter as such a concentration will tend to produce marked changes in the crystalline structure in that it will approach the structure of fused silica. A concentration between $10^{17}$ and $5\times10^{17}$ neutrons per square centimeter should preferably be employed for the purposes of the invention.

After a suitable type and quantity of impurity atoms have been introduced into the quartz crystal lattice, and/or the element has been irradiated with neutrons, as described above, the material can be processed as a further step in the methods of the invention in the following manner. It can be heated to a temperature of between 400 degrees centigrade and 450 degrees centigrade and vibrated while at that temperature at strains up to $10^{-4}$ (ratio of increase in length at maximum stress to original length) for a period of a few minutes (five to ten minutes). This will effectively pin all dislocation loops for elastic longitudinal strains of at least $8\times10^{-5}$.

A modified form of the "further" step just described will produce an appreciable beneficial effect even with nominally pure quartz crystals which have not been irradiated with neutrons and into which no additional impurity atoms have been introduced. In accordance with the modified step, the tendency of a nominally pure quartz crystal frequency controlling element to change frequency with time, with energy surges, and with mechanical shock, as above described, can be substantially reduced by heating it to a temperature between 400 degrees centigrade and 450 degrees centigrade and vibrating it while at that temperature to produce strains up to $2\times10^{-5}$ for a period of a few minutes (by way of example, from five to ten minutes).

The process as just described (whether employed by itself or as a step following the introduction of additional impurities and/or irradiation by neutrons) facilitates migration of the impurity atoms and they are consequently more readily available to be picked up by the vibrating dislocation loops causing shorter pinning distances and more firmly pinned loops to be established.

This process alone (i.e. heating and vibrating) when applied to nominally pure quartz, otherwise untreated, will extend the region of linear operation up to strains of $2\times10^{-5}$. However, it is often desirable to employ quartz crystal frequency controlling elements under conditions producing higher strains and therefore it will be preferable in many instances to include as a preliminary step the introduction of additional impurity atoms into the crystal lattice as described hereinabove and, as well, as a further preliminary step the irradiation of the crystal by neutrons, as is also described hereinabove.

By the combination of all three of the above-described steps (i.e. introducing an appropriate percentage of suitable impurities into the structure of the quartz, irradiating the crystal with neutrons to a concentration between $10^{17}$ and $5\times10^{17}$ neutrons per square centimeter, and heating the quartz crystal to a temperature between 400 degrees centigrade and 450 degrees centigrade, vibrating the crystal while at that temperature with strains up to $10^{-4}$, and cooling the crystal) a quartz crystal frequency controlling element will be obtained which will not vary in frequency with time unless subjected to strain amplitudes in excess of $10^{-4}$. Accordingly for strain amplitudes resulting from surges of electrical energy or from mechanical shocks, crystals treated by the complete method including all of the three steps of the invention will not be adversely affected by strain resulting from electrical surges or mechanical shocks provided the strain does not exceed $10^{-4}$. This is an improvement of 1,000 percent as compared with untreated quartz crystal frequency controlling elements of the prior art.

FIG. 2 illustrates diagramamtically one arrangement for heating a quartz crystal frequency controlling element to a temperature between 400 and 450 degrees centigrade and vibrating it while at the elevated temperature at a predetermined strain. In FIG. 2 the element 40 to be treated is provided with conductive electrodes 42 substantially covering its two opposing major surfaces. Electrodes 42 can conveniently be of thin copper foil, by way of specific example. Electrodes 42 are connected to the output of the adjustable amplitude source of high frequency power 48 and the element 40 can thus be driven piezoelectrically to a vibrational strain determined by the amplitude to which source 48 is adjusted. Element 40 is further enclosed in enclosure 44 and source of heat 46 furnishes heat to the enclosure 44 through pipe 47 to raise the temperature within the enclosure to between 400 and 450 degrees centigrade and to maintain the temperature at the selected value under control of thermostat 45.

FIG. 3 illustrates diagrammatically a second arrangement for heating the quartz element to an elevated temperature and vibrating it while at that elevated temperature at a predetermined strain. The heating arrangements, that is enclosure 44, source of heat 46 connected to enclosure 44 by pipe 47, and heat controlling thermostat 45, are all as described for use in the arrangement of FIG. 2.

In FIG. 3 the quartz element is subjected to the desired vibrating longitudinal strain by use of a mechanical transformer 52 driven by an electromechanical transducer 50 to which power is supplied by high frequency source 58. Member 52 should have a free sliding fit with enclosure 44. Reference may be had to applicant's Patent 2,514,080, granted July 4, 1950, and applicant's joint patent with R. F. Wick, 2,573,168, granted October 30, 1951, for detailed information concerning the use of a mechanical tapered horn type transformer to subject test specimens to predetermined strain amplitudes.

Irradiation by neutrons is of course effected by subjecting the quartz crystal to neutrons emitted by a thermopile through an opening in which the concentration of neutrons can be accurately controlled in accordance with practices well known and extensively used by those skilled in the art. For information covering this feature, reference may be had to an article by R. Berman, entitled "The Thermal Conductivities of Some Dielectric Solids at Low Temperatures," published in the Proceedings of the Royal Society of London, volume 208A, page 90 (1951), giving a discussion of the effect of neutron irradiation on quartz.

Numerous and varied applications of the principles of the present invention within the spirit and scope thereof will readily occur to those skilled in the art. The above examples are given by way of illustration and the invention is not to be construed as being limited to the specific embodiments described.

What is claimed is:

1. A method of producing an improved quartz crystal frequency controlling element comprising introducing impurity atoms to a concentration of approximately 1,000 parts per million into the lattice structure of the element, bombarding the element with neutrons at an integrated concentration between $10^{17}$ and five times $10^{17}$ neutrons per square centimeter, heating the element to a temperature between 400 and 450 degrees centigrade, vibrating the element while at the said temperature to a maximum strain of $10^{-4}$, and thereafter cooling the element.

2. A method of increasing the stability over extended periods of time and reducing the susceptibility to change by mechanical and electrical shocks of a quartz crystal frequency controlling element comprising introducing impurity atoms to a concentration of approximately 1,000 parts per million into the lattice structure of the element, heating the element to a temperature between 400 and 450 degrees centigrade, vibrating the element while at the said temperature to a strain of $10^{-4}$, and thereafter cooling it to room temperature.

3. A method of producing an improved quartz crystal frequency controlling element comprising bombarding the element with neutrons at a concentration between $10^{17}$ and five times $10^{17}$ neutrons per square centimeter, heating the element to a temperature between 400 and 450 degrees centigrade, vibrating the element while at said temperature to a maximum strain of $10^{-4}$, and thereafter cooling it to room temperature.

4. The method of stabilizing the resonant frequency of a quartz crystal frequency controlling element comprising heating the crystal to a temperature between 400 degrees centigrade and 450 degrees centigrade, maintaining the crystal at the said temperature while subjecting it to vibrational strains to an amplitude of two times $10^{-5}$, and thereafter cooling it to room temperature.

5. The method of stabilizing the resonant frequency of a quartz crystal frequency controlling element over an extended period of time and reducing its susceptibility to change by mechanical and electrical shocks comprising introducing an impurity of between 100 parts per million and one percent of a material from the class consisting of germanium, iridium, manganese, molybdenum, osmium, lead, ruthenium, tin, tellurium, thallium, titanium, uranium, vanadium, tungsten, and zirconium, heating the crystal to a temperature between 400 degrees centigrade and 450 degrees centigrade, maintaining the crystal at said temperature while subjecting it to vibrational strains to an amplitude of $10^{-4}$, and thereafter cooling it to room temperature.

6. The method of stabilizing the resonant frequency of a quartz crystal frequency controlling element comprising irradiating the crystal with neutrons to a concentration between $10^{17}$ and five times $10^{17}$ neutrons per square centimeter.

7. The method of claim 5 and the step of irradiating the crystal with neutrons to a concentration between $10^{17}$ and five times $10^{17}$ neutrons per square centimeter prior to heating the crystal.

8. The method of stabilizing the resonant frequency of a quartz crystal frequency controlling element comprising introducing an impurity element of between 100 parts per million and one percent of a material selected from the class consisting of iridium, manganese, molybdenum, osmium, lead, ruthenium, tin, tellurium, thallium, titanium, uranium, vanadium, tungsten and zirconium and irradiating the crystal with neutrons to a concentration between $10^{17}$ and five times $10^{17}$ neutrons per square centimeter.

References Cited in the file of this patent

UNITED STATES PATENTS

| | | |
|---|---|---|
| 2,268,823 | Herzog | Jan. 6, 1942 |
| 2,437,915 | Frondel | Mar. 16, 1948 |
| 2,871,192 | Augustine et al. | Jan. 27, 1959 |

OTHER REFERENCES

Effects of Impurities on Resonator Properties of Quartz, I.R.E. Proceedings, September 1955, vol. 43, page 1137.